Nov. 9, 1948.    H. SHIPSTEAD    2,453,277
VACUUM TREATMENT OF MILK POWDER
Filed Jan. 8, 1942
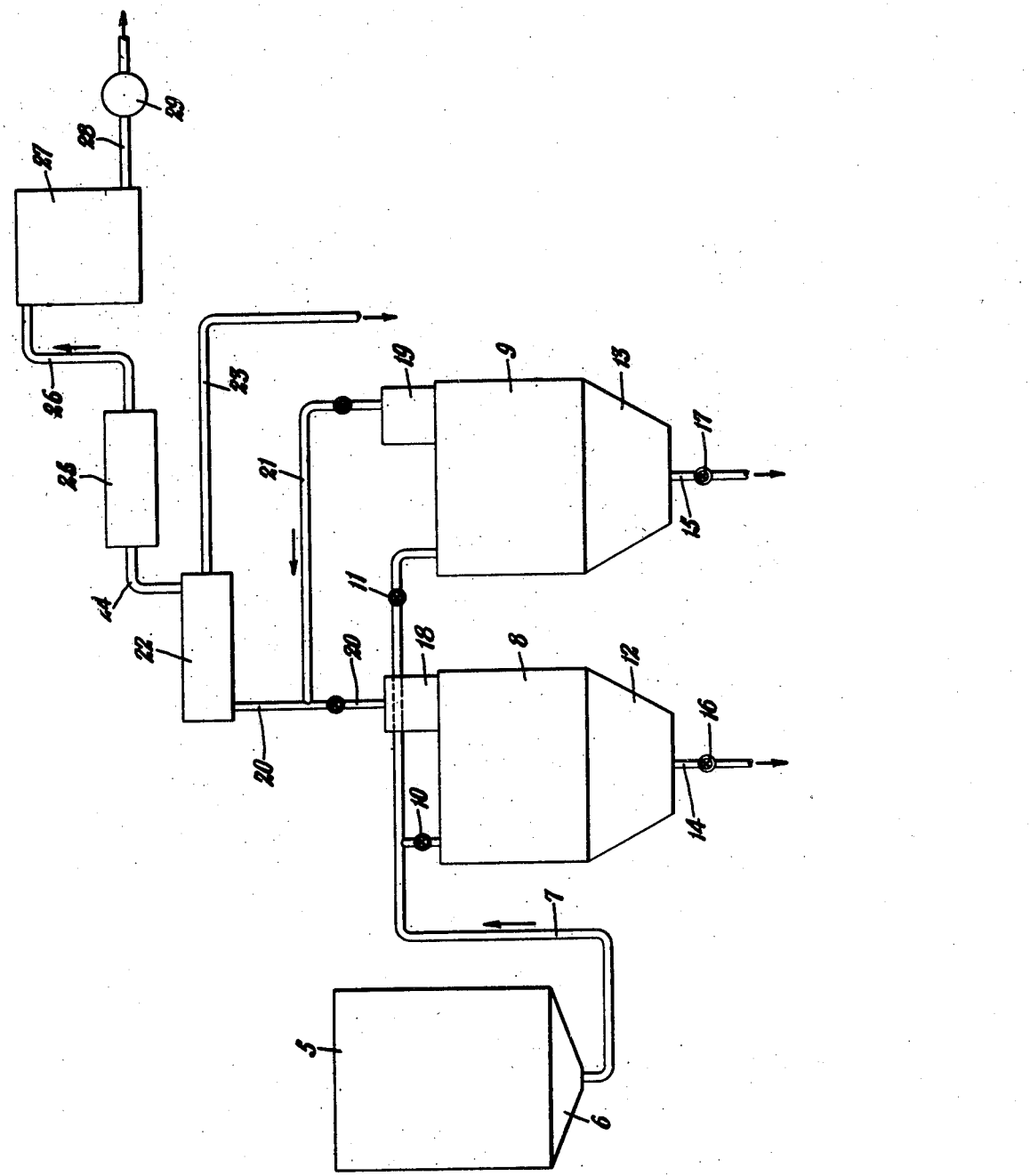
INVENTOR
HELGE SHIPSTEAD
BY
ATTORNEY Patented Nov. 9, 1948

2,453,277

UNITED STATES PATENT OFFICE 2,453,277

VACUUM TREATMENT OF MILK POWDER

Helge Shipstead, Syracuse, N. Y., assignor to The Borden Company, New York, N. Y., a corporation of New Jersey Application January 8, 1942, Serial No. 425,960

3 Claims. (Cl. 99—203)

This invention relates to the handling of freshly dried milk powders, and is concerned more particularly with a vacuum treatment of such milk powders.

According to the methods heretofore used for the handling of freshly dried milk powders, the powder, whether it is dried by the revolving drum process or by spray drying, is cooled only incidentally either by short contact with air or by contact with metal parts as it is conveyed to the packaging equipment. No secondary drying of the warm milk powder takes place. On the contrary, if too much cold air is allowed to contact the warm powder, it may even take on extra moisture before it is packaged.

It may be packaged directly, or it may be ground in some way before packaging. In the case of spray dried whole milk powder, it is usually necessary to package this powder under non-oxidizing conditions if its quality is to be preserved for some length of time. The use of extensive vacuum treatments, either before the powder is packaged or after it is placed in the cans, is generally considered necessary in order to remove both free and occluded oxygen.

I have found, however, that important advantages may be obtained by subjecting warm milk powder, preferably the freshly dried powder as it comes from the drying operation and before it is cooled, to a vacuum treatment. For example, if such a warm powder is transferred immediately to a chamber maintained under vacuum and allowed to cool therein, the powder does not take up occluded air or oxygen as it does when it is cooled under ordinary conditions exposed to the air. In addition, the rate of cooling of the warm powder can be greatly accelerated if the proper conditions including temperature and moisture content of the powder together with a proper degree of vacuum are maintained. Such accelerated cooling is produced by evaporation of moisture from the powder, and therefore makes it possible to operate the drying process more efficiently because a larger percentage of residual moisture can be left in the product as initially dried.

One object of this invention is to subject freshly dried warm milk powders to treatment under a vacuum.

A further object is the utilization of such a vacuum treatment to provide a rapid cooling of the powder with an attendant reduction in its moisture content.

A further object of the invention is to utilize such a vacuum treatment as a convenient means for conveying or handling the powder as it leaves the drying apparatus.

Other objects will be described and will be apparent from the following description of certain embodiments of my invention, one of which is illustrated in the accompanying drawing.

The figure of the drawing illustrates diagrammatically apparatus for treating spray dried milk powder under a vacuum.

In the drawing, numeral 5 indicates a spray drying apparatus which may be of any conventional construcion and which is preferably provided with an inclined bottom 6. As will be understood by those skilled in the art, the unit 5 is provided with a suitable spray nozzle for introducing finely divided condensed milk into the chamber through which passes a current of heated air. The dry milk powder falls to the bottom of the dry box and is conveyed by suitable means into the vacuum line 7 which leads to the vacuum tanks 8 and 9. Suitable valves 10 and 11 may be provided to control the passage of powder to one or the other of these vacuum tanks.

The vacuum tanks 8 and 9 are preferably provided with inverted conical lower sections 12 and 13, to which are connected outlet pipes 14 and 15 provided with suitable control valves 16 and 17. These outlet pipes 14 and 15 may be used to draw off the powder when desired.

Suitable air separating devices 18 and 19 are provided attached to the upper portions of the tanks 8 and 9, and the pipes 20 and 21 provided with suitable valves lead from the top of these powder and air separating units to a filter 22. Powder which is separated in the filter 22 may be drawn off through the pipe 23 or by other suitable means. The filter 22 is connected by a short pipe 24 to a booster 25 which is in turn connected by the pipe 26 to a regulation condenser 27. The condenser 27 communicates through the pipe 28 with the inlet side of a vacuum pump 29, or, if desired, a double steam ejector may be used in place of a mechanical pump at 29.

Thus, as the air is drawn out of the vacuum tanks 8 and 9 by the vacuum pump 29, this air carrying some of the powder passes first through one of the air separators 18 and 19 to prevent the bulk of the powder in the chambers 8 and 9 from being drawn out of the chambers, and thence through a filtering device 22 where any residual powder is separated, to the booster 25. This booster may be a simple, high pressure steam injector pump. It is usually desirable to use such a booster if a high degree of vacuum is to be maintained in the tanks 8 and 9 because a single vacuum pump is usually inadequate for this purpose as a practical matter. If a high vacuum is not required, however, the booster 25 may be omitted.

The air containing substantial quantities of moisture then passes through the condenser 27 where the moisture is condensed out, and flows to the main vacuum pump 29. It will be apparent, of course, that various other provisions may be used for maintaining the tanks 8 and 9 under a vacuum without drawing off substantial quantities of the milk powder in the tanks 8 and 9.

By proper manipulation of the valves, it will be possible to use one of the vacuum tanks 8 or 9 at a time, holding the other one in reserve and cutting it in as needed without interrupting the flow of milk powder from the spray drying unit 5. While two such vacuum tanks have been illustrated, only one of the tanks is actually needed; on the other hand, any suitable number of vacuum tanks may be hooked up together, the tanks being used as storage units when filled with powder.

In the operation of such a system, the milk powder from the spray drying unit 5 is drawn by the vacuum in tanks 8 or 9 through the pipe 7, which acts as a pneumatic conveying tube. Some air is necessarily drawn through pipe 7 along with the milk powder in order to maintain a free passage of the powder through the pipe. It is best, therefore, to open the valve 10 or 11, either intermittently or periodically, in order to avoid letting a continuous and excessive flow of air into the vacuum tanks. The powder is thus admitted in batches into the vacuum tanks without more than a momentary lowering of the vacuum. It has been found that it is not necessary to introduce into the vacuum tank 8 or 9 more than about 10 cubic feet of air per minute in order to convey the powder satisfactorily without clogging through a two inch diameter pipe. It is desirable, of course, to keep the total flow of air through the pipe 7 at as low a value as possible, because any air introduced into the vacuum tank 8 or 9 through the pipe 7 has to be drawn off ultimately by the vacuum pump 29.

As the powder is received in the vacuum tank, it may be maintained under a very low absolute pressure of the order of 5–10 mm. of mercury, or it may be maintained under a more moderate vacuum, as desired. In either case, the powder is cooled in the absence of substantial quantities of air, and thus is ready almost immediately for packaging under non-oxidizing conditions. On the other hand, one of the tanks 8 or 9, when it is substantially filled with powder, may be sealed off and thus maintained under a suitable vacuum as long as desired, providing a vacuum storage unit for the powder until it is ready to be packaged.

This process is particularly advantageous for whole milk or similar powders that are ordinarily packaged under non-oxidizing conditions. However, the use of a low absolute pressure to produce additional drying and an accelerated cooling is advantageous in handling skim milk or any other milk product as well as whole milk powder. Such an accelerated cooling avoids, to some extent at least, the cooked taste and therefore improves the flavor of the product. The degree of flavor improvement, of course, will depend upon the exact rate of cooling obtained.

Excellent results, for example, have been obtained by conveying freshly spray dried milk powder at a temperature of about 160° F. and containing about 2.5 to 3.0% moisture into a tank held at an absolute pressure of around 5 mm. of mercury. Under these conditions, a substantial quantity of the residual moisture in the powder will be removed, the water vapor being drawn off by the vacuum pump, because the vapor tension of such warm powder is considerably above 5 mm. pressure.

The following table of water vapor tensions of whole milk powder under various conditions is useful in practicing my invention in enabling one to predict the amount of drying and cooling that will take place under a given set of conditions.

Table

| Temp., ° F. | Moisture Content | | | | |
|---|---|---|---|---|---|
| | 1.5% | 2% | 2.5% | 3% | 3.5% |
| | Mm. | Mm. | Mm. | Mm. | Mm. |
| 100 | 3.0 | 5.5 | 8.0 | 12.0 | 16.5 |
| 110 | 3.5 | 6.5 | 10.0 | 14.5 | 19.5 |
| 120 | 4.8 | 8.0 | 13.0 | 18.0 | 25.0 |
| 130 | 6.5 | 12.0 | 18.0 | 25.0 | 33.0 |
| 140 | 9.0 | 16.0 | 24.0 | 32.0 | 43.0 |
| 150 | 13.5 | 21.5 | 31.5 | 42.5 | 56.5 |
| 160 | 19.0 | 29.0 | 40.0 | 55.0 | 73.0 |
| 170 | 27.0 | 38.0 | 52.0 | 70.0 | 91.0 |

For example, if the powder is introduced into the vacuum tank at a temperature of 160° F. with a moisture content of 3%, it is apparent from the table that with a pressure of 8 mm. in the vacuum tank, the moisture will drop to 2% if the powder cools down to 120° F.

The particular conditions of temperature, moisture content of the freshly dried powder, and pressure in the vacuum tank can be selected to accomplish simply a cooling under vacuum, an accelerated cooling principally, additional drying, or combinations of these results.

If the primary object in practicing the invention is to produce quick cooling, the pipe 7 may even be provided with a cooling jacket. The vacuum chamber can then be maintained under a more moderate vacuum and little, if any, additional drying of the powder will take place.

On the other hand, if the vacuum treatment is used in combination with a spray drier, substantial economies can be effected by producing a whole milk powder with a moisture content of 2.5–3.5% in the spray drier and removing some of this moisture in the vacuum tank. To produce substantial drying in the vacuum tank, it is, of course, necessary to maintain a fairly low pressure therein. In addition, the drying is increased if the temperature of the powder entering the tank is fairly high. It may be desirable, therefore, to insulate the pipe 7 so as to bring the powder into the vacuum tank at a higher temperature.

Various other conveying means, such as a screw conveyor, may be used in place of the pipe 7, although pneumatic conveying of a powder is particularly advantageous for drying because the flow of air aids in carrying off moisture from the product.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim.

1. In a process for the manufacture of dry products from liquid lacteal materials, the steps comprising spraying the material into a controlled drying chamber to form a pulverulent material of a predetermined moisture content higher than desired in the final product, removing said pulverulent material from said drying chamber while hot and conveying it to the cooling chamber under conditions to minimize loss of heat, and then subjecting a mass of the pulverulent material to sub-atmospheric pressure substantially below the vapor pressure of the moisture contained in the hot pulverulent material whereby a portion of the moisture content is flashed off and the material cooled.

2. In a process for the manufacture of powdered milk products wherein the liquid lacteal material is sprayed into contact with hot gas in a controlled drying chamber to produce a product which is removable from said drying chamber as a hot powder, the steps comprising removing powdered products of predetermined moisture content higher than desired in the final product from said chamber at an elevated temperature and subjecting the hot powder to sub-atmospheric pressure substantially below the vapor pressure of the moisture contained in the hot powder whereby a portion of the moisture content is flashed off and the powder cooled.

3. In a process for the manufacture of powdered milk products from liquid lacteal material, the steps of effecting primary drying of the lacteal material by heat transfer to the same to form a hot divided solid material having a moisture content substantially in excess of the moisture content of the final product, and then transferring the material without substantial loss of sensible heat to a zone of secondary treatment in which the material is subjected to a vacuum below the vapor pressure of moisture remaining in the material to thereby rapidly reduce the moisture content and cool the same.

HELGE SHIPSTEAD.

REFERENCES CITED

The following references are of record in the file of this patent:

UNITED STATES PATENTS

| Number | Name | Date |
|---|---|---|
| 1,361,239 | Fleming | Dec. 7, 1920 |
| 1,432,635 | Stevens | Oct. 17, 1922 |
| 2,016,592 | Chuck | Oct. 8, 1935 |
| 2,035,673 | Schultz | Mar. 31, 1936 |
| 2,088,606 | Peebles et al. | Aug. 3, 1937 |
| 2,118,252 | Kraft | May 25, 1938 |
| 2,188,506 | Hall | Jan. 30, 1940 |

FOREIGN PATENTS

| Number | Country | Date |
|---|---|---|
| 394,182 | Great Britain | June 22, 1933 |

OTHER REFERENCES

"Chemical Engineering," by D. Liddell, volume I, first edition, 1922, McGraw Hill Book Co., Inc., N. Y.

PO-1050
(5/69)

UNITED STATES PATENT OFFICE
CERTIFICATE OF CORRECTION

Patent No. 3,453,277  Dated April 16, 1970

Inventor(s) Ramuz et al.

It is certified that error appears in the above-identified patent and that said Letters Patent are hereby corrected as shown below:

Claim 1, Column 9, Line 31 "isopkinolyl" should be isoquinolyl

SIGNED AND
SEALED
JUL 14 1970

(SEAL)
Attest:

Edward M. Fletcher, Jr.
Attesting Officer

WILLIAM E. SCHUYLER, JR.
Commissioner of Patents